US011498860B2

(12) United States Patent
Park et al.

(10) Patent No.: US 11,498,860 B2
(45) Date of Patent: Nov. 15, 2022

(54) REVERSE OSMOSIS APPARATUS AND SEAWATER DESALINATION SYSTEM HAVING THE SAME

(71) Applicant: DOOSAN ENERBILITY CO., LTD., Changwon-si (KR)

(72) Inventors: Yong Hae Park, Busan (KR); Wee Kwan Kang, Yongin (KR); Hye Ryun Ahn, Suwon (KR); Young Geun Lee, Yongin (KR)

(*) Notice: Subject to any disclaimer, the term of this patent is extended or adjusted under 35 U.S.C. 154(b) by 0 days.

(21) Appl. No.: 17/334,331

(22) Filed: May 28, 2021

(65) Prior Publication Data
US 2021/0380453 A1 Dec. 9, 2021

(30) Foreign Application Priority Data

Jun. 3, 2020 (KR) .................. 10-2020-0067091

(51) Int. Cl.
| | |
|---|---|
| *B01D 61/02* | (2006.01) |
| *B01D 61/04* | (2006.01) |
| *B01D 61/08* | (2006.01) |
| *C02F 1/44* | (2006.01) |
| *C02F 103/08* | (2006.01) |

(Continued)

(52) U.S. Cl.
CPC .............. *C02F 9/00* (2013.01); *B01D 61/022* (2013.01); *B01D 61/025* (2013.01); *B01D 61/04* (2013.01); *B01D 61/08* (2013.01); *B01D 63/12* (2013.01); *B01D 2313/04* (2013.01); *B01D 2313/20* (2013.01); *B01D 2319/025* (2013.01); *B01D 2319/04* (2013.01); *C02F 1/004* (2013.01);

(Continued)

(58) Field of Classification Search
CPC .. B01D 61/025; B01D 61/08; B01D 2313/08; B01D 2313/20
See application file for complete search history.

(56) References Cited

FOREIGN PATENT DOCUMENTS

| JP | 63039686 A | 2/1988 |
|---|---|---|
| JP | 2001137672 A | 5/2001 |

(Continued)

OTHER PUBLICATIONS

KR Decision to Grant dated Oct. 25, 2021.

*Primary Examiner* — Bradley R Spies
(74) *Attorney, Agent, or Firm* — Harvest IP Law, LLP (57) ABSTRACT

A reverse osmosis apparatus for a seawater desalination system is provided. The reverse osmosis apparatus includes: a barrel in which a plurality of reverse osmosis membrane units with a reverse osmosis membrane wrapped in each reverse osmosis membrane unit are arranged; an inflow and outflow portion provided at a first end of the barrel and connected to a seawater inlet a high salinity water outlet; a partition wall configured to partition an inner space of the inflow and outflow portion into a first stage and a second stage; and a transport space portion provided in a second end of the barrel and configured to guide water being moved from a plurality of reverse osmosis membrane units arranged in the first stage to move to a plurality of reverse osmosis membrane units arranged at the second stage, wherein part of seawater fed to the inflow and outflow portion is fed around the tubes in the barrel and insulates the plurality of reverse osmosis membrane units in the barrel from external high temperature while being moved, and flows into the transport space portion.

20 Claims, 7 Drawing Sheets

(51) Int. Cl.
  *C02F 9/00*     (2006.01)
  *B01D 63/12*    (2006.01)
  *C02F 1/00*     (2006.01)

(52) U.S. Cl.
  CPC .......... *C02F 1/441* (2013.01); *C02F 2103/08* (2013.01); *C02F 2301/08* (2013.01)

(56) References Cited

FOREIGN PATENT DOCUMENTS

| | | | | |
  |---|---|---|---|---|
  | JP | 2012076073 | A | 4/2012 | |
  | JP | 2012176370 | A | 9/2012 | |
  | JP | 5287789 | B2 | 9/2013 | |
  | KR | 100913382 | B1 | 8/2009 | |
  | KR | 101576804 | B1 * | 12/2015 | ............. B01D 63/02 |
  | KR | 1020170140920 | A | 12/2017 | |

* cited by examiner

REVERSE OSMOSIS APPARATUS AND SEAWATER DESALINATION SYSTEM HAVING THE SAME

CROSS REFERENCE TO RELATED APPLICATION

This application claims priority to Korean Patent Application No. 10-2020-0067091, filed on Jun. 3, 2020, the disclosure of which is incorporated herein by reference in its entirety.

FIELD

Apparatuses and methods consistent with exemplary embodiments relate to a reverse osmosis apparatus and a seawater desalination system having the same.

BACKGROUND

In general, a processing system for desalinating seawater is configured to primarily remove impurities by pumping seawater stored in a storage tank with a predetermined volume through a transport pump to sand or a multi-layered filter in a pretreatment step. And if necessary, the seawater desalination system is configured to remove organic impurities by passing the seawater through an activated carbon filter, and finally remove fine impurities by passing the seawater through a cartridge filter, a bag filter, or the like.

Pretreated water subjected to such pretreated process is introduced into a reverse osmosis filter for desalination and is separated into desalinated permeated water and concentrated water, and the concentrated water is discharged, and the desalinated permeated water is mineralized and sterilized in a post-treatment step and flows into a final treatment storage tank.

A related art reverse osmosis filter is configured such that a plurality of reverse osmosis membrane units are arranged by being inserted into a barrel. In detail, when seawater introduced into a first side of each of the reverse osmosis membrane units is moved toward a second side of the reverse osmosis membrane unit, the seawater passes through a reverse osmosis membrane by reverse osmosis and is collected to a tube at a center of the reverse osmosis membrane unit, thereby being discharged through the second side of the reverse osmosis membrane unit.

However, the related art reverse osmosis filter, especially a reverse osmosis filter with a large treatment capacity, has problems such as a bulky design, high energy consumption rate, large maintenance cost, and difficulty in operation and maintenance.

In addition, in order to maintain the reverse osmosis membrane unit in the barrel below 40° C., an insulation material such as polymeric resin is arranged in a space between the barrel and the plurality of reverse osmosis membrane units. However, the insulation effect is insufficient, so safety concerns still remain, and the production cost of the insulation material is high.

Furthermore, when the reverse osmosis membrane units are inserted into the barrel, an O-ring provided at an outer circumferential surface of the barrel is twisted so that seawater leaks into the barrel and tube pressure is lost.

SUMMARY

Aspects of one or more exemplary embodiments provide a reverse osmosis apparatus and a seawater desalination system having the same. In particular, part of seawater fed to an inflow and outflow portion of a barrel is filled and moved in a space between the barrel and a plurality of reverse osmosis membrane units thereby insulating the reverse osmosis membrane units from external high temperature, a baffle is provided inside the barrel thereby securing flow residence time of the seawater, seawater fed into the reverse osmosis membrane units increases in temperature due to heat thereby increasing the production rate of permeated water and increasing recovery rate, and the insulating seawater introduced into the barrel is mixed with high salinity water passing through the reverse osmosis membrane units in the transport space portion and then the mixed and diluted water with increased flow rate is introduced into the reverse osmosis membrane units in a second stage thereby distributing the load appropriately.

Additional aspects will be set forth in part in the description which follows and, in part, will become apparent from the description, or may be learned by practice of the exemplary embodiments.

According to an aspect of an exemplary embodiment, there is provided a reverse osmosis apparatus for a seawater desalination system, the reverse osmosis apparatus including: a barrel in which a plurality of reverse osmosis membrane units each having a reverse osmosis membrane wrapped in a tube may be arranged; an inflow and outflow portion provided in a first end of the barrel and connected to a seawater inlet and a high salinity water outlet; a partition wall configured to partition an inner space of the inflow and outflow portion into a first stage and a second stage; and a transport space portion provided in a second end of the barrel and configured to guide water moved from a plurality of reverse osmosis membrane units arranged in the first stage to move to a plurality of reverse osmosis membrane units arranged in the second stage, wherein part of seawater fed to the inflow and outflow portion may be fed around the tubes in the barrel and insulate the plurality of reverse osmosis membrane units in the barrel from external high temperature while being moved, and flow into the transport space portion.

The plurality of reverse osmosis membrane units arranged in the barrel may include: a plurality of first reverse osmosis membrane units arranged inside the first stage and configured to reduce salinity of the seawater fed from the inflow and outflow portion; and a plurality of second reverse osmosis membrane units arranged inside the second stage and configured to reduce salinity of seawater fed from the transport space portion.

The reverse osmosis apparatus may further include first treated water tubes connected to first ends of the plurality of first reverse osmosis membrane units and connected to an outside of the barrel by passing through the inflow and outflow portion, and second treated water tubes connected to first ends of the plurality of second reverse osmosis membrane units and connected to the outside of the barrel by passing through the inflow and outflow portion.

Each of the first and second reverse osmosis membrane units may be configured in a form of a tube sheet in which the plurality of reverse osmosis membrane units may be connected in series, and a sheet shaped reverse osmosis membrane may be wrapped around a tube having a plurality of through holes formed on a circumferential surface of the tube.

The reverse osmosis apparatus may further include a baffle provided in an intermediate portion in the barrel, the baffle being configured such that the plurality of reverse osmosis membrane units in the barrel may be inserted into the baffle and having a plurality through holes in one side of the baffle to allow the seawater to pass.

Each of the first and second reverse osmosis membrane units may include: a cylindrical casing portion having a reverse osmosis membrane therein; and a head portion coupled to one end of the casing portion and having an outlet hole at a center portion thereof and inlet holes at positions around the center portion.

The head portion may include: a cylindrical main body in which the outlet hole and the inlet holes may be provided; a first connection tube connected to a first side of the outlet hole; a second connection tube connected to a second side of the outlet hole; and a reduced diameter portion connected from a rim of the main body to the second connection tube while being reduced in diameter thereof.

The head portion may include: a head seal mounted to an outer circumferential surface of the main body to seal a gap between the outer circumferential surface of the main body and an inner circumferential surface of the casing portion; and a retaining ring mounted to the outer circumferential surface of the main body to fix the head portion to the inner circumferential surface of the casing portion.

One of the reverse osmosis membrane units and another reverse osmosis membrane unit may be connected to each other in series by an adapter that may be inserted into outlet holes of both the reverse osmosis membrane units to connect central flow paths thereof to each other.

The adapter may include: a first insertion tube inserted into the outlet hole of the one reverse osmosis membrane unit; a second insertion tube inserted into the outlet hole of the another reverse osmosis membrane unit; a connection tube connecting the first insertion tube to the second insertion tube and configured as an integral body having an outer diameter larger than outer diameters of the first and second insertion tubes; and a plurality of seals respectively mounted to outer circumferential surfaces of the first insertion tube and the second insertion tube.

According to an aspect of another exemplary embodiment, there is provided a seawater desalination system including: a pretreatment apparatus configured to intake seawater and filter impurities in the introduced seawater; a cartridge filter configured to re-filter the water pre-filtered by the pretreatment apparatus; and a reverse osmosis apparatus configured to receive the water filtered by the cartridge filter from a high pressure pump to produce fresh water by reverse osmosis, wherein the reverse osmosis apparatus may include: a barrel in which a plurality of reverse osmosis membrane units each having a reverse osmosis membrane wrapped in a tube may be arranged; an inflow and outflow portion provided in a first end of the barrel and connected to a seawater inlet and a high salinity water outlet; a partition wall configured to partition an inner space of the inflow and outflow portion into a first stage and a second stage; and a transport space portion provided in a second end of the barrel and configured to guide water moved from a plurality of reverse osmosis membrane units arranged in the first stage to move to a plurality of reverse osmosis membrane units arranged in the second stage, wherein part of seawater fed to the inflow and outflow portion may be fed around the tubes in the barrel and insulates the plurality of reverse osmosis membrane units in the barrel from external high temperature while being moved, and flow into the transport space portion.

The plurality of reverse osmosis membrane units arranged in the barrel may include: a plurality of first reverse osmosis membrane units arranged in a space of the first stage and configured to reduce salinity of the seawater fed from the inflow and outflow portion; and a plurality of second reverse osmosis membrane units arranged in a space of the second stage and configured to reduce salinity of the seawater fed from the transport space portion.

The reverse osmosis apparatus may further include first treated water tubes connected to first ends of the plurality of first reverse osmosis membrane units and connected to an outside of the barrel by passing through the inflow and outflow portion; and second treated water tubes connected to first ends of the plurality of second reverse osmosis membrane units and connected to the outside of the barrel by passing through the inflow and outflow portion.

Each of the first and second reverse osmosis membrane units may be configured in a form of a tube sheet in which the plurality of reverse osmosis membrane units may be connected in series, and a sheet shaped reverse osmosis membrane may be wrapped around a tube having a plurality of through holes formed on a circumferential surface of the tube.

The reverse osmosis apparatus may further include a baffle provided in an intermediate portion in the barrel, the baffle being configured such that the plurality of reverse osmosis membrane units in the barrel are inserted into the baffle and having a plurality through holes in one side of the baffle to allow the seawater to pass.

Each of the first and second reverse osmosis membrane units may include: a cylindrical casing portion having a reverse osmosis membrane therein; and a head portion coupled to one end of the casing portion and having an outlet hole at a center portion thereof and inlet holes at portions around the center portion.

The head portion may include: a cylindrical main body in which the outlet hole and the inlet holes are provided; a first connection tube connected to a first side of the outlet hole; a second connection tube connected to a second side of the outlet hole; and a reduced diameter portion connected from a rim of the main body to the second connection tube while being reduced in diameter thereof.

The head portion may include: a head seal mounted to an outer circumferential surface of the main body to seal a gap between the outer circumferential surface of the main body and an inner circumferential surface of the casing portion; and a retaining ring mounted to the outer circumferential surface of the main body to fix the head portion to the inner circumferential surface of the casing portion.

One of the reverse osmosis membrane units and another reverse osmosis membrane unit may be connected to each other in series by an adapter that may be inserted into outlet holes of both the reverse osmosis membrane units to connect central flow paths thereof to each other.

The adapter may include: a first insertion tube inserted into the outlet hole of the one reverse osmosis membrane unit; a second insertion tube inserted into the outlet hole of the another reverse osmosis membrane unit; a connection tube connecting the first insertion tube to the second insertion tube and configured as an integral body having an outer diameter larger than outer diameters of the first and second insertion tubes; and a plurality of seals respectively mounted to outer circumferential surfaces of the first insertion tube and the second insertion tube.

According to the reverse osmosis apparatus and the seawater desalination system having the same of one or more exemplary embodiments, part of seawater fed to the inflow and outflow portion of the barrel is filled in and moves to a space between the barrel and the plurality of reverse osmosis membrane units so that the reverse osmosis membrane units may be insulated from external high temperature, and the baffle is provided inside the barrel so that flow residence time of seawater may be secured.

In addition, seawater fed into the reverse osmosis membrane units has increased temperature due to heat so that the production rate of permeated water and the recovery rate may be increased, the insulating seawater introduced into the barrel is mixed with high salinity water in the transport space portion, passes through the reverse osmosis membrane units, and then the mixed and diluted water with increased flow rate is introduced into the reverse osmosis membrane units arranged in the second stage so that the load may be properly distributed.

Furthermore, in the design of a large capacity reverse osmosis apparatus, a compact design may be realized by performing filtration by a reverse osmosis membrane in two stages, and energy consumption may be reduced.

Furthermore, the life of the reverse osmosis membrane is extended and t the replacement of the reverse osmosis membrane units is easy, thereby reducing maintenance costs.

BRIEF DESCRIPTION OF THE DRAWINGS

The above and other aspects will be more clearly understood from the following description of the exemplary embodiments with the accompanying drawings, in which.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiments, but they should be construed to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. The terms such as "comprise," "include", "including", "have/has", and/or "having" should be construed as designating that there are such features, integers, steps, operations, elements, components, and/or combinations thereof, but not to preclude the presence or possibility of adding of one or more other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinbelow, exemplary embodiments will be described in detail with reference to the accompanying drawings. The same reference numerals will be used throughout the drawings and the description to refer to the same or like elements or parts. In certain embodiments, a detailed description of functions and configurations well known in the art maybe omitted to avoid obscuring appreciation of the disclosure by a person of ordinary skill in the art. For the same reason, some elements may be exaggerated, omitted, or schematically illustrated in the accompanying drawings.

Figure 1:
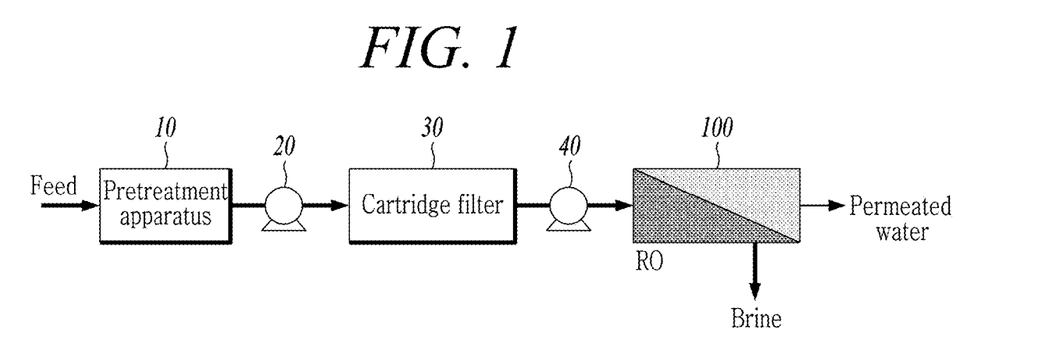
FIG. 1 is a view schematically showing a seawater desalination system according to an exemplary embodiment.

FIG. 1 is a view schematically showing a seawater desalination system according to an exemplary embodiment.

Referring to FIG. 1, the seawater desalination system may include a pretreatment apparatus 10, a cartridge filter 30, and a reverse osmosis apparatus 100.

The pretreatment apparatus 10 is configured to intake seawater and filter impurities in the introduced water. An intake device provided to intake seawater may be arranged in front of the pretreatment apparatus 10.

Pretreatment process of the pretreatment apparatus 10 includes a precipitation treatment, a filtration treatment, and a chemical treatment. The precipitation treatment and the filtration treatment are performed to prevent contamination of membranes by removing suspended solid in raw water. The chemical treatment is performed to control water quality of feed water so as to maintain performance of a reverse osmosis membrane. Furthermore, high performance pretreatment is necessary to prevent contamination of the reverse osmosis membrane.

The cartridge filter 30 is configured to re-filter the pretreated and filtered water to remove fine impurities from the water. A feed pump 20 may be arranged in front of the cartridge filter 30 in order to feed the pretreated water to the cartridge filter 30 at a predetermined pressure.

The reverse osmosis apparatus 100 is configured to receive the water filtered through the cartridge filter 30 by a high pressure pump 40 to generate fresh water by reverse osmosis (RO). RO is a phenomenon in which pure solvent escapes from a solution through a semipermeable membrane when a pressure higher than osmotic pressure is applied. Seawater may be desalinated by RO. In order to cause RO, the high pressure pump 40 for supplying filtered water at a pressure higher than the osmotic pressure of seawater is arranged in front of the reverse osmosis apparatus 100.

When the feed seawater passes through the reverse osmosis apparatus 100, the seawater is converted to high salinity water, and the water passing through the reverse osmosis membrane is converted to permeated water. A post-treatment apparatus may be arranged in rear of the reverse osmosis apparatus 100 to re-treat the filtered permeated water. The post-treatment apparatus may perform pH adjustment, mineral injection, and chlorination.

Figure 2:
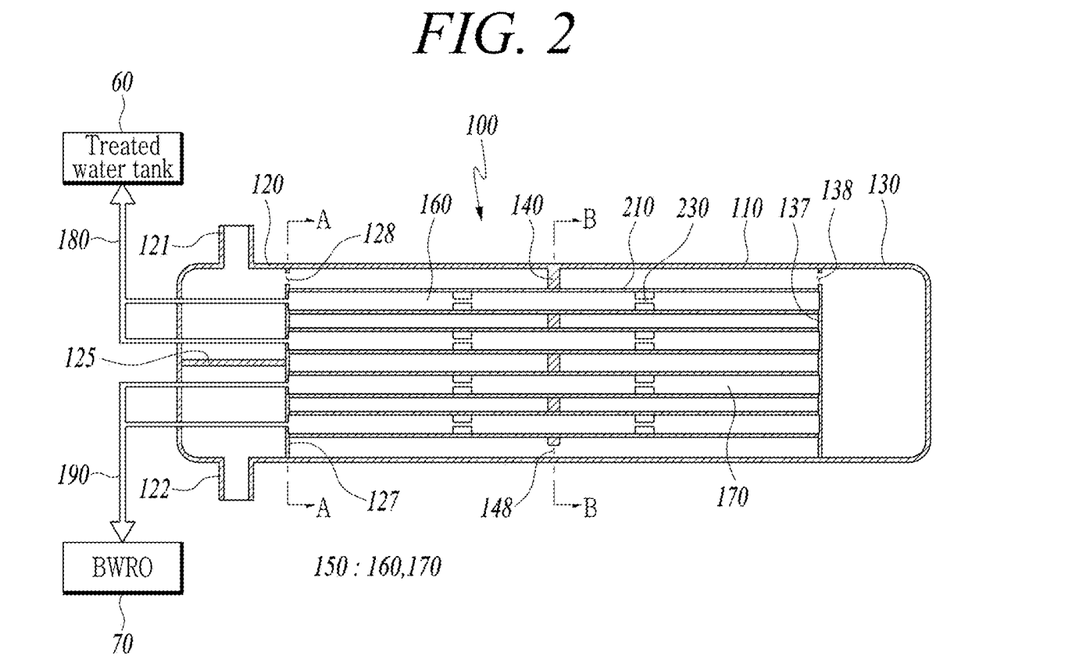
FIG. 2 is a view schematically showing a reverse osmosis apparatus according to the exemplary embodiment.
Figure 3A:
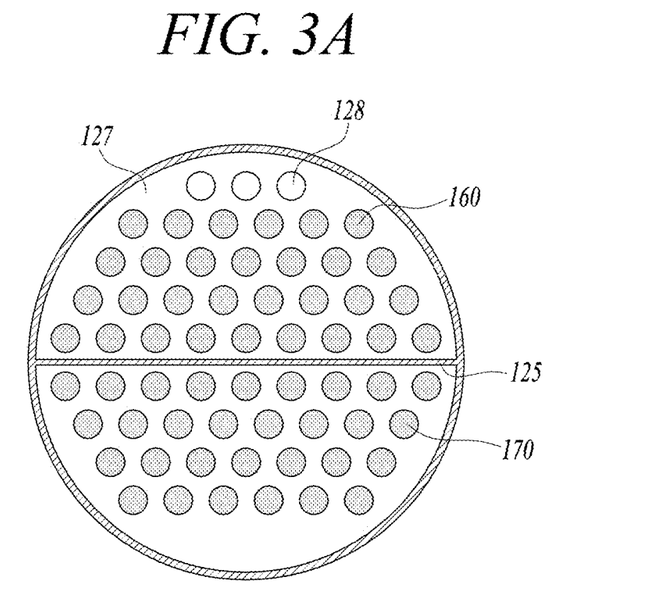
FIG. 3A is a sectional view taken along line A-A in FIG. 2.
Figure 3B:
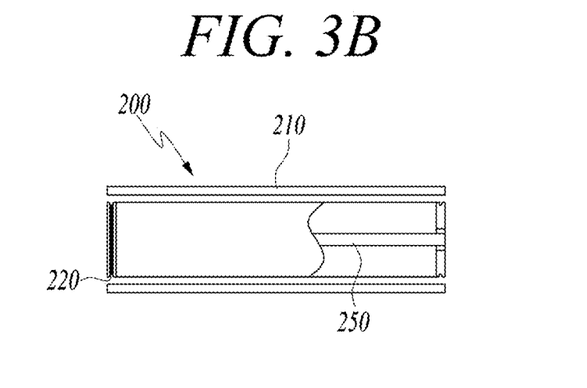
FIG. 3B is a view showing a single reverse osmosis membrane unit.
Figure 4:
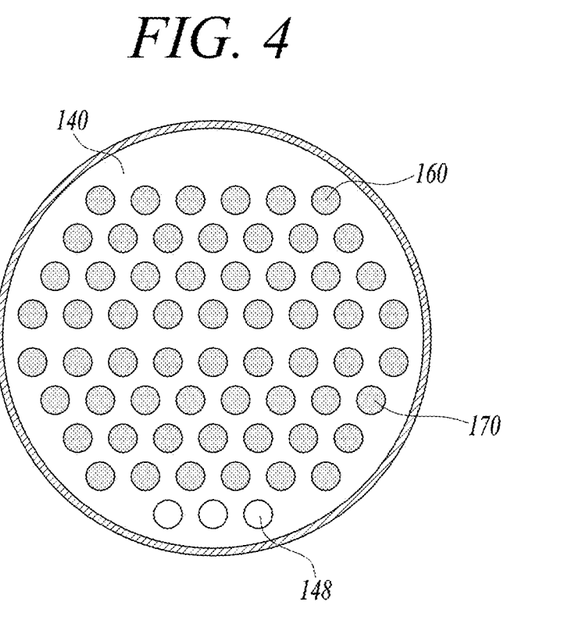
FIG. 4 is a sectional view taken along line B-B in FIG. 2.
Figure 5A:
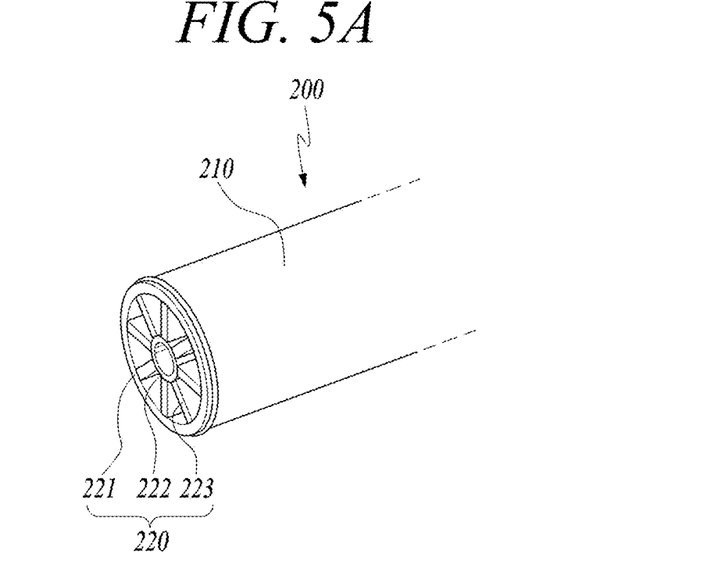
FIG. 5A is a partial perspective view showing a reverse osmosis membrane unit according to the exemplary embodiment.
Figure 5B:
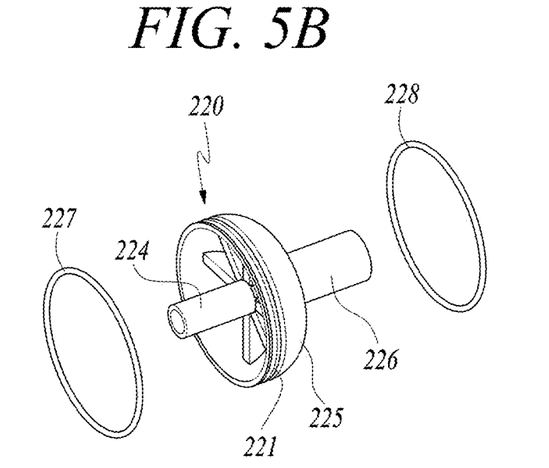
FIG. 5B is a disassembled perspective view showing a head portion.
Figure 6A:
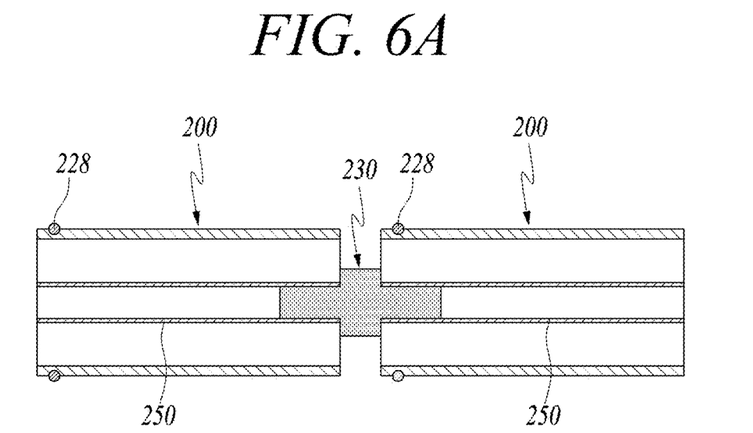
FIG. 6A is a view schematically showing two reverse osmosis membrane units connected to each other by an adapter.
Figure 6B:
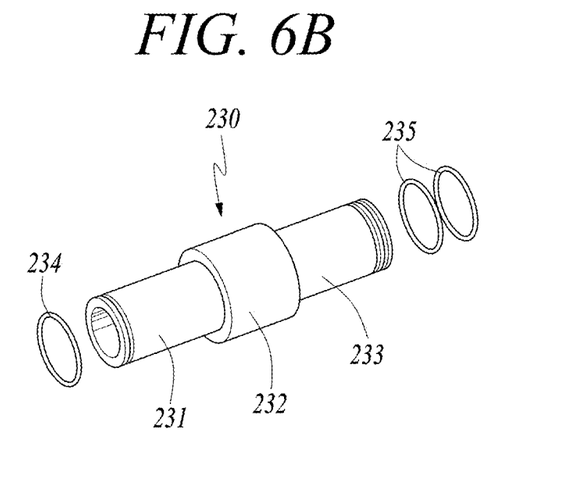
FIG. 6B is a disassembled perspective view showing the adapter.

FIG. 2 is a view schematically showing a reverse osmosis apparatus 100 according to the exemplary embodiment. FIG. 3A is a sectional view taken along line A-A in FIG. 2, and FIG. 3B is a view showing a single reverse osmosis membrane unit. FIG. 4 is a sectional view taken along line B-B in FIG. 2. FIG. 5A is a partial perspective view showing a reverse osmosis membrane unit according to the exemplary embodiment, and FIG. 5B is a disassembled perspective view showing a head portion. FIG. 6A is a view schematically showing two reverse osmosis membrane units connected to each other by an adapter, and FIG. 6B is a disassembled perspective view showing the adapter.

Referring to FIG. 2, the reverse osmosis apparatus 100 for the seawater desalination system includes a barrel 110 in which a plurality of reverse osmosis membrane units 150 each having a reverse osmosis membrane wrapped in a tube are arranged, an inflow and outflow portion 120 provided in a first end of the barrel 110 and connected to a seawater inlet 121 and a high salinity water outlet 122, a partition wall 125 partitioning an inner space of the inflow and outflow portion 120 into a first stage and a second stage, and a transport space portion 130 provided in a second end of the barrel 110 and configured to guide water moving from a plurality of reverse osmosis membrane units arranged in the first stage to flow into a plurality of reverse osmosis membrane units arranged in the second stage.

The barrel 110 may be provided such that a cylinder with a diameter of several meters is arranged horizontally in a longitudinal direction thereof.

Inside the barrel 110, the plurality of reverse osmosis membrane units 150 may be arranged in rows and columns. For example, a plurality of set in which several reverse osmosis membrane units 150 are connected together in series may be arranged in the cylindrical barrel 110 in parallel. As shown in FIG. 3A, the plurality of reverse osmosis membrane units 150 may be arranged to be spaced apart from each other in the barrel 110.

As shown in FIG. 2, the inflow and outflow portion 120 may be provided inside a left end of the barrel 110, and the transport space portion 130 may be provided inside a right end of the barrel 110. The partition wall 125 partitioning the inflow and outflow portion 120 into two spaces may be provided in an intermediate portion inside the inflow and outflow portion 120. A virtual plane extended from the partition wall 125 may partition the inside of the barrel 110 into the left first stage and the right second stage. That is, a plurality of reverse osmosis membrane units 150 arranged in the first stage may constitute a first reverse osmosis membrane units 160, and a plurality of reverse osmosis membrane units 150 in the second stage may constitute the second reverse osmosis membrane units 170.

In the barrel 110, the plurality of first reverse osmosis membrane units 160 and the plurality of second reverse osmosis membrane units 170, each of the reverse osmosis membrane units is configured in a set in which 3 to 10 of reverse osmosis membrane units are connected to each other in parallel, may be arranged in parallel.

The inflow and outflow portion 120 to which the seawater inlet 121 and the high salinity water outlet 122 are connected may be coupled to the first end of the barrel 110. For example, the seawater with high pressure may be pumped into the inflow and outflow portion 120 through the seawater inlet 121 by the high pressure pump 40, and high salinity or concentrated water passing through the plurality of first reverse osmosis membrane units 160 arranged in the first stage and the plurality of second reverse osmosis membrane units 170 arranged in the second stage may be discharged through the high salinity water outlet 122.

The entire transport space portion 130 may be removably coupled to the second end of the barrel 110. Otherwise, the transport space portion 130 may have a sealable door provided with a first end of the transport space portion 130 to allow a person to enter the transport space portion 130. A manager can easily perform maintenance tasks such as replacing the reverse osmosis membrane units 150 by entering the removable or openable transport space portion 130. The transport space portion 130 may guide the water moving from the plurality of first reverse osmosis membrane units 160 arranged in the first stage to flow into the plurality of reverse osmosis membrane units 170 arranged in the second stage. The seawater introduced in the inflow and outflow portion 120 through the seawater inlet 121 may move toward the transport space portion 130 and pass through the plurality of first reverse osmosis membrane units 160 arranged in the first stage, and in the transport space portion 130, the water may pass through the plurality of second reverse osmosis membrane units 170 arranged in the second stage and move toward the inflow and outflow portion 120.

Part of seawater fed to the inflow and outflow portion 120 is fed around tubes in the barrel 110 and insulates the plurality of reverse osmosis membrane units 150 from external high temperature while being moved, thereby being introduced into the transport space portion 130.

The inflow and outflow portion 120 may be separated from the inside of the barrel 110 in which the plurality of reverse osmosis membrane units 150 are arranged by a partition wall 127. The partition wall 127 may be formed in a circular disc and airtightly coupled to an inner circumferential surface of the cylindrical barrel 110. The partition wall 127 may have a plurality of through holes to which first ends of the plurality of reverse osmosis membrane units 150 are mounted and a plurality of through holes 128 through which part of seawater introduced into the inflow and outflow portion 120 passes. As shown in FIG. 3A, the circular disc-shaped partition wall 127 has the plurality of through holes 128, the first ends of the reverse osmosis membrane units 150 are mounted to most of the through holes, and 1 to 10 of the through holes 128 are not coupled with the reverse osmosis membrane units 150 and may serve as paths through which seawater moves.

The transport space portion 130 may be partitioned from the inside of the barrel 110 accommodating the plurality of reverse osmosis membrane units 150 by a partition wall 137. As shown in FIG. 2, the partition wall 137 may be formed in a circular disc, and airtightly coupled to the inner circumferential surface of the barrel 110. The partition wall 137 may have a plurality of through holes to which first ends of the plurality of reverse osmosis membrane units 150 are mounted and a plurality of through holes 138 through which part of seawater introduced into the inflow and outflow portion 120 passes.

The reverse osmosis apparatus 100 may further include first treated water tubes 180 and second treated water tubes 190. The first treated water tubes 180 are connected to first ends of the plurality of first reverse osmosis membrane units 160, and are connected to the outside of the barrel 110 by passing through the inflow and outflow portion 120. The second treated water tubes 190 are connected to first ends of the plurality of second reverse osmosis membrane units 170, and are connected to the outside of the barrel 110 by passing through the inflow and outflow portion 120.

Permeated water generated by the plurality of first reverse osmosis membrane units 160 may be transported to a treated water tank 60 through the first treated water tubes 180 connected to the first reverse osmosis membrane units 160.

Furthermore, permeated water generated by the plurality of second reverse osmosis membrane units 170 may be transported to a brackish water reverse osmosis (BWRO) 70 through the second treated water tubes 190 connected to the second reverse osmosis membrane units 170.

BWRO means brackish water reverse osmosis, and brackish water refers to water having a salinity between seawater and fresh water. A salinity of the permeated water generated by the second reverse osmosis membrane units 170 by RO is higher than a salinity of the permeated water generated by the first reverse osmosis membrane units 160. That is, the water increased in salinity during primarily filtration in the first stage is secondarily reverse-permeated in the second stage. Accordingly, a salinity of the permeated water may be reduced by allowing the permeated water generated by the second reverse osmosis membrane units 170 to pass through the secondary RO process in the BWRO 70.

Referring to FIG. 3B, each of the reverse osmosis membrane units 200 is formed in a tube sheet type in which a plurality of reverse osmosis membrane units 200 are connected in series, wherein a sheet shaped reverse osmosis membrane is wrapped around a tube having a plurality of through holes at a circumferential surface of the tube.

As shown in FIG. 2, the tubes 210 are mounted in a space between the partition wall 127 of the inflow and outflow portion 120 and the partition wall 137 of the transport space portion 130, and three reverse osmosis membrane units 150 may be coupled to the inside of each of the tubes 210, and 3 to 8 of the reverse osmosis membrane units 150 may be mounted to the inside of each of the tubes 210 with respect to the capacity.

As shown in FIG. 3B, a head portion 220 may be coupled to a first side of a low salinity water tube 250 and a flange portion may be coupled to a second side thereof. The reverse osmosis membrane may be wrapped around the low salinity tube 250 by several times. The low salinity water tube 250 of one of the reverse osmosis membrane units 200 may be connected to the low salinity water tube 250 of another one of the reverse osmosis membrane units 200 by an adapter 230. As described above, the three connected reverse osmosis membrane units 200 may be inserted into and mounted to the tube 210.

As shown in FIG. 2, the reverse osmosis apparatus 100 may include a baffle 140 at an intermediate portion inside the barrel 110, wherein the baffle 140 receives the plurality of reverse osmosis membrane units 150 inserted through the baffle 140 and has a plurality of through holes 148 at one side thereof to allow seawater to pass through the baffle 140. The baffle 140 may be arranged to be suspended from intermediate portions of the reverse osmosis membrane units 150 based on a longitudinal direction of the barrel 110.

Referring to FIG. 4, the baffle 140 includes a plurality of through holes in which the plurality of first reverse osmosis membrane units 160 and the plurality of second reverse osmosis membrane units 170 are inserted and the plurality of through holes 148 through which seawater passes. The plurality of through holes 148 of the baffle 140 may be arranged at a position opposite to positions of the through holes 128 of the partition wall 127 of the inflow and outflow portion 120 and the through holes 138 of the partition wall 137 of the transport space portion 130. Therefore, seawater passing through the through holes 128, 148, and 138 moves in zigzag, so that residence time of the seawater may be increased as a flow path is extended.

The baffle 140 may be formed of duplex stainless steel, or a material of carbon steel coated with a rubber lining. The material of carbon steel coated with a rubber lining is cheaper than the duplex stainless steel, but the duplex stainless steel is excellent in material properties.

The duplex stainless steel has a dual complex metallurgical structure by consisting of roughly dispersed austenite metal and ferrite metal. The duplex stainless steel has high strength and corrosion resistance compared to general stainless steel, and is evaluated as a material suitable for harsh use environments, such as nuclear power plants, desalination facilities, various offshore constructions, and biogas facilities, thereby gradually increasing the field of use.

The duplex stainless steel has a dual structure consisting of two phases. Structurally, austenite is deeply dispersed into ferrite and the ratio of the austenite phase to the ferrite phase is almost 1:1. This structure prevents growth of grains in the material to form small grains, thereby generating a structure that is more rigid than other metals.

Referring to FIG. 5A, each of the reverse osmosis membrane units 200 may include a cylindrical casing portion 210 having a reverse osmosis membrane therein and the head portion 220 coupled to one end of the casing portion 210 and having an outlet hole at a center portion thereof and inlet holes around the center portion.

The head portion 220 may include a circular rim-shaped main body 221 inserted into the one end of the casing portion 210, a hub 222 enclosing the outlet hole at the center portion thereof, and a plurality of blades 223 integrally connected between an outer circumferential surface of the hub 222 and an inner circumferential surface of the main body 221. The plurality of blades 223 may provide a plurality of inlet holes between the blades.

Inside the cylindrical casing portion 210, the reverse osmosis membrane may be arranged in a form surrounding a center portion corresponding to the outlet hole of the head portion 220 or a plurality of reverse osmosis membranes may be arranged to be layered. Accordingly, water may be collected into the center portion of the casing portion 210 by passing through the reverse osmosis membrane from the seawater introduced to the outside of the reverse osmosis membrane.

Referring to FIG. 5B, the head portion 220 may include the cylindrical main body 221 having the outlet hole and the inlet holes therein, a first connection tube 224 connected to a first side of the outlet hole, a second connection tube 226 connected to a second side of the outlet hole, and a reduced diameter portion 225 connected from a rim of the main body 221 to the second connection tube 226 with a decrease in a diameter of the head portion.

The head portion 220 in FIG. 5B may be configured such that the first connection tube 224 and the second connection tube 226 may be integrally connected to both sides of the hub 222 having the central outlet hole. When the head portion 220 has the first connection tube 224 and the second connection tube 226, the treated water tubes 180 and 190 may be easily connected to the first connection tube 224, and the reverse osmosis membrane may be easily mounted by being arranged around the second connection tube 226. A plurality holes may be formed on the reduced diameter portion 225 to allow a fluid to pass through the holes.

The head portion 220 may further include a head seal 228 mounted to an outer circumferential surface of the main body 221 to seal a gap between the outer circumferential surface of the main body 221 and an inner circumferential surface of the casing portion 210 and a retaining ring 227 mounted to the outer circumferential surface of the main body 221 to fix the head portion 220 to the inner circumferential surface of the casing portion 210.

The outer circumferential surface of the main body 221 may have grooves to which the head seal 228 and the retaining ring 227 are mounted.

The head seal 228 may be made of a rubber material such as ethylene propylene diene monomer (EPDM), and the retaining ring 227 may be made of a stainless steel material.

Meanwhile, in the exemplary embodiments, the plurality of cassette modules 150 may be connected to each other in series and the plurality of reverse osmosis membrane units 200 provided in the cassette modules 150 may be connected to each other in series. In FIG. 1, three cassette modules 150 are connected to each other in series, and the series-connected cassette modules are simultaneously connected to each other in parallel.

Referring to FIG. 6A, one reverse osmosis membrane unit 200 and another reverse osmosis membrane unit 200 may be connected to each other in series by the adapter 230 connecting central flow paths of both the reverse osmosis membrane units while being inserted into outlet holes thereof.

As shown in FIG. 6A, the head seal 228 is provided on an outer circumferential surface of one end of each of the reverse osmosis membrane units 200, and the adapter 230 is inserted between center portion of both the reverse osmosis membrane units 200, thereby being coupled thereto.

Referring to FIG. 6B, the adapter 230 may include a first insertion tube 231 inserted into the outlet hole of the first-side reverse osmosis membrane unit 200, a second insertion tube 233 inserted into the outlet hole of the second-side reverse osmosis membrane unit 200, and a connection tube 232 connecting the first insertion tube 231 and the second insertion tube 233 into an integrated body having an outer diameter larger than those of the first and second insertion tubes 231 and 233.

The first insertion tube 231 may be formed to have an outer diameter larger than that of the second insertion tube 233, and the first insertion tube 231, the connection tube 232, and the second insertion tube 233 may have flow paths therein to allow the water passing through the reverse osmosis membrane to be moved.

An adapter seal 234 may be mounted to an outer circumferential surface of an end of the first insertion tube 231, and two drinking water seals 235 may be mounted to an outer circumferential surface of an end of the second insertion tube 233. The adapter seal 234 may be made of a rubber material such as EPDM similar to the drinking water seals 235. The adapter seal 234 and the drinking water seals 235 may seal a connection portion between the two reverse osmosis membrane units 200 to prevent leakage of the production water.

Figure 7:
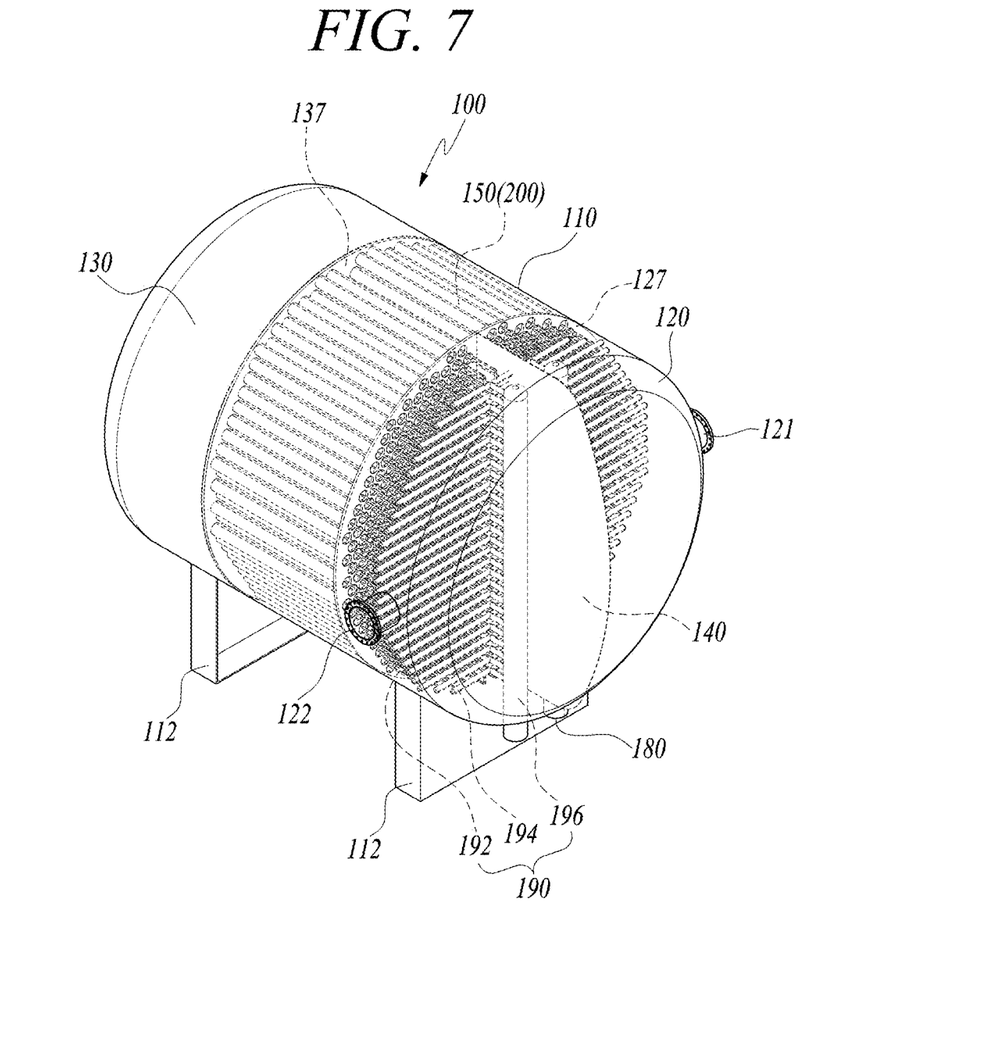
FIG. 7 is a partial perspective projection view showing a reverse osmosis apparatus having a tube sheet type reverse osmosis membrane unit structure according to another exemplary embodiment.

FIG. 7 is a partial perspective projection view showing a reverse osmosis apparatus having a tube sheet type reverse osmosis membrane unit structure according to another exemplary embodiment.

Referring to FIG. 7, the reverse osmosis apparatus 100 having the reverse osmosis membrane units of the tube sheet type includes the inflow and outflow portion 120 provided in the first end of the cylindrical barrel 110, the transport space portion 130 provided in the second end thereof, and a plurality of reverse osmosis membrane units 150(200) arranged in the space between the inflow and outflow portion 120 and the transport space portion 130.

The cylindrical barrel 110 may be provided to be supported on the ground by a pair of supports 112 coupled to a lower portion of the barrel 110 by welding or fastening. Alternatively, the barrel 110 may be mounted in a frame entirely surrounding the barrel 110.

The partition wall 127 of the inflow and outflow portion 120 may have the through holes for passage of the seawater at a portion close to a right end thereof.

The plurality of first reverse osmosis membrane units 160 may be arranged in the space between the two partition walls 127 and 137 in the barrel 110. The permeated water generated by the plurality of first reverse osmosis membrane units 160 may be transported to the treated water tank 60 through the first treated water tubes 180, and the permeated water generated by the plurality of second reverse osmosis membrane units 170 may be transported to the BWRO 70 through the second treated water tubes 190.

The partition wall 125 may be provided in the inflow and outflow portion 120 perpendicular to the ground, the seawater inlet 121 may be provided on a first surface of the inflow and outflow portion 120, and the high salinity water outlet 122 may be provided on a second surface of the inflow and outflow portion 120.

Seawater introduced into the inflow and outflow portion 120 through the seawater inlet 121 is introduced into the plurality of first reverse osmosis membrane units 160, so that primarily reverse osmosis permeated water is transported to the treated water tank 60 through the first treated water tubes 180. High salinity water that has not passed through the reverse osmosis membranes is discharged to the transport space portion 130 and then flows into the plurality of second reverse osmosis membrane units 170 so that secondary reverse osmosis permeated water is transported to the BWRO 70 through the second treated water tubes 190.

The first treated water tubes 180 are provided at an inflow side inside the inflow and outflow portion 120 to discharge the permeated water generated by the plurality of first reverse osmosis membrane units 160. The second treated water tubes 190 are provided at an outflow side inside the inflow and outflow portion 120 to discharge the permeated water generated by the plurality of second reverse osmosis membrane units 170.

A plurality of connection tubes 192 are respectively connected to a right end of the plurality of second reverse osmosis membrane units 170 arranged at the second stage. The plurality of connection tubes 192 are configured such that connection tubes arranged at the same level are connected to an intermediate connection tube 194, and a plurality of intermediate connection tubes 194 are connected to a collecting tube 196 arranged vertically. Accordingly, the permeated water may be transported to the BWRO 70 through the second treated water tubes 190. Likewise, the first treated water tubes 180 may include connection tubes, intermediate connection tubes, and a collecting tube, and may be formed to be symmetrical to the second treated water tubes 190.

The collecting tube of the first treated water tubes 180 and the collecting tube 196 of the second treated water tubes 190 may be respectively configured such that the permeated water is discharged downward through the inside of the inflow and outflow portion 120.

Figure 8:
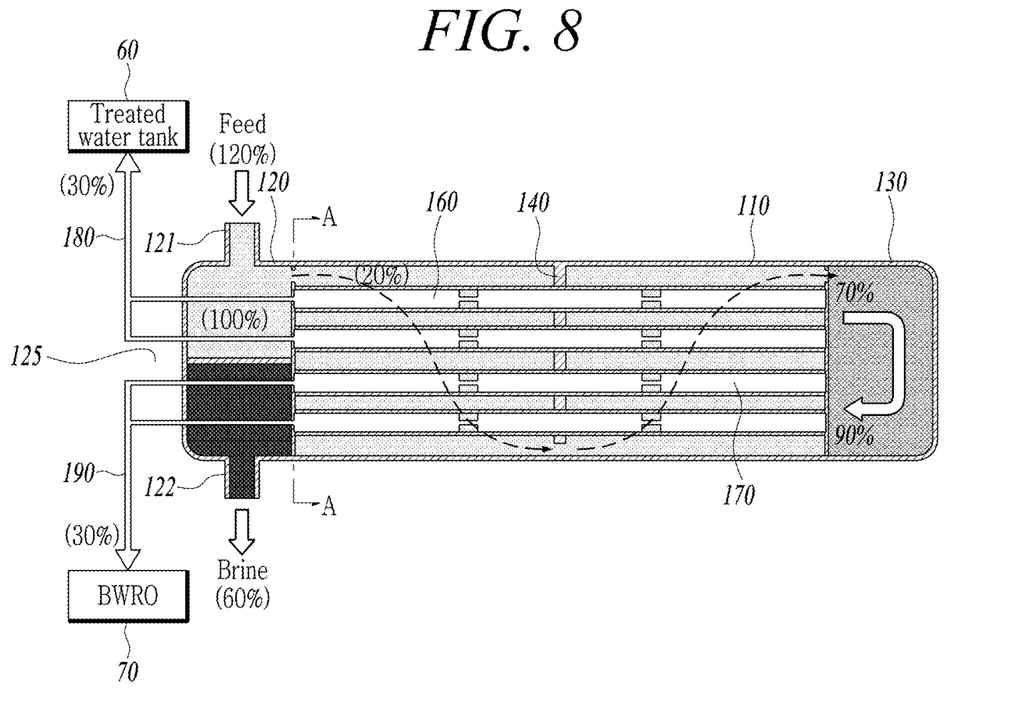
FIG. 8 is a view schematically showing a flow of water in the reverse osmosis apparatus in FIG. 2.

FIG. 8 is a view schematically showing a flow of water in the reverse osmosis apparatus in FIG. 2. According to the reverse osmosis apparatus 100, the seawater desalination process will be described with reference to FIG. 8.

The pretreatment apparatus 10 pretreats seawater introduced from the intake device, and the high pressure pump 40 feeds the seawater to the seawater inlet 121 at high pressure. The seawater introduced into the inflow and outflow portion 120 may be introduced into the outside of the reverse osmosis membrane of the plurality of first reverse osmosis membrane units 160, water passes through the reverse osmosis membrane from the seawater by RO and is collected to the low salinity water tube 250 at the center, and the water may be transported to the treated water tank 60 through the first treated water tubes 180. If the seawater fed to the inflow and outflow portion 120 through the seawater inlet 121 is 120%, 100% of the seawater may be introduced from the inflow and outflow portion 120 to the plurality of first reverse osmosis membrane units 160, and 20% of the seawater may be introduced into peripheral spaces of the plurality of first reverse osmosis membrane units 160 and the plurality of second reverse osmosis membrane units 170 through the through holes 128.

After the 100% of the seawater introduced into the plurality of first reverse osmosis membrane units 160 is separated from the water by RO, 70% of the seawater with increased salinity is introduced into the transport space portion 130. Among the 100% of the seawater introduced into the plurality of first reverse osmosis membrane units 160, 30% of the seawater with decreased salinity while passing through the reverse osmosis membrane is transported to the treated water tank 60 through the first treated water tubes 180.

The 70% of the seawater introduced into the transport space portion 130 is mixed with the 20% of the seawater introduced into the transport space portion 130 through the through holes of the partition wall 137. The mixed 90% amount of the seawater is introduced into the plurality of second reverse osmosis membrane units 170, and among the seawater, water passes through the reverse osmosis membrane and is collected to the center portion and may be transported to the BWRO 70 through the second treated water tubes 190. The water transported to the BWRO 70 is relatively higher salinity water than the water transported to the treated water tank 60, so that a secondary reverse osmosis process proceeds in the BWRO 70. Concentrated water with high salinity while losing water in the plurality of second reverse osmosis membrane units 170 is separated from the seawater by RO may be discharged through the high salinity water outlet 122. The concentrated water may be additionally treated to be discharged as sewage.

According to one or more exemplary embodiments, part of seawater fed to the inflow and outflow portion of the barrel is filled and moved in the space between the barrel and the plurality of reverse osmosis membrane units, thereby insulating the reverse osmosis membrane units from external high temperature, and the baffle is provided inside the barrel, thereby securing flow residence time of seawater.

In addition, seawater fed into the reverse osmosis membrane units has increased temperature due to heat so that the production rate of permeated water and the recovery rate may be increased, the insulating seawater introduced into the barrel is mixed with high salinity water passing through the reverse osmosis membrane units in the transport space portion, and then the mixed and diluted water with increased flow rate is introduced into the reverse osmosis membrane units arranged in the second stage so that the load may be properly distributed.

In addition, in designing a large capacity reverse osmosis apparatus, a compact design may be realized by performing filtration by a reverse osmosis membrane in two stages, and energy consumption may be reduced.

Furthermore, the life of the reverse osmosis membrane is extended and the replacement of the reverse osmosis membrane units is easy, thereby reducing maintenance costs.

While one or more exemplary embodiments have been described with reference to the accompanying drawings, it is to be understood by those skilled in the art that various modifications and changes in form and details may be made therein, without departing from the scope and spirit as disclosed in the accompanying claims. Accordingly, the description of the exemplary embodiments should be construed in a descriptive sense only and not to limit the scope of the claims, and many alternatives, modifications, and variations will be apparent to those skilled in the art.

What is claimed is:

1. A reverse osmosis apparatus for a seawater desalination system, the reverse osmosis apparatus comprising:
    a barrel in which a plurality of reverse osmosis membrane units each having a reverse osmosis membrane wrapped in a tube are arranged;
    an inflow and outflow portion provided in a first end of the barrel and connected to a seawater inlet and a high salinity water outlet;
    a partition wall configured to partition an inner space of the inflow and outflow portion into a first stage and a second stage; and
    a transport space portion provided in a second end of the barrel and configured to guide water moved from a plurality of reverse osmosis membrane units arranged in the first stage to move to a plurality of reverse osmosis membrane units arranged in the second stage,
    wherein part of seawater fed to the inflow and outflow portion is fed around the tubes in the barrel and insulates the plurality of reverse osmosis membrane units in the barrel from external high temperature while being moved, and flows into the transport space portion.

2. The reverse osmosis apparatus of claim 1, wherein the plurality of reverse osmosis membrane units arranged in the barrel comprises:
    a plurality of first reverse osmosis membrane units arranged inside the first stage and configured to reduce salinity of the seawater fed from the inflow and outflow portion; and
    a plurality of second reverse osmosis membrane units arranged inside the second stage and configured to reduce salinity of seawater fed from the transport space portion.

3. The reverse osmosis apparatus of claim 2, further comprising:
    first treated water tubes connected to first ends of the plurality of first reverse osmosis membrane units and connected to an outside of the barrel by passing through the inflow and outflow portion; and
    second treated water tubes connected to first ends of the plurality of second reverse osmosis membrane units and connected to the outside of the barrel by passing through the inflow and outflow portion.

4. The reverse osmosis apparatus of claim 2, wherein each of the first and second reverse osmosis membrane units is configured in a form of a tube sheet in which the plurality of reverse osmosis membrane units are connected in series, and wherein a sheet shaped reverse osmosis membrane is wrapped around a tube having a plurality of through holes formed on a circumferential surface of the tube.

5. The reverse osmosis apparatus of claim 1, further comprising:
a baffle provided in an intermediate portion in the barrel, the baffle being configured such that the plurality of reverse osmosis membrane units in the barrel are inserted into the baffle and having a plurality through holes in one side of the baffle to allow the seawater to pass.

6. The reverse osmosis apparatus of claim 1, wherein each of the first and second reverse osmosis membrane units comprises:
a cylindrical casing portion having a reverse osmosis membrane therein; and
a head portion coupled to one end of the casing portion and having an outlet hole at a center portion thereof and inlet holes at positions around the center portion.

7. The reverse osmosis apparatus of claim 6, wherein the head portion comprises:
a cylindrical main body in which the outlet hole and the inlet holes are provided;
a first connection tube connected to a first side of the outlet hole;
a second connection tube connected to a second side of the outlet hole; and
a reduced diameter portion connected from a rim of the main body to the second connection tube while being reduced in diameter thereof.

8. The reverse osmosis apparatus of claim 7, wherein the head portion further comprises:
a head seal mounted to an outer circumferential surface of the main body to seal a gap between the outer circumferential surface of the main body and an inner circumferential surface of the casing portion; and
a retaining ring mounted to the outer circumferential surface of the main body to fix the head portion to the inner circumferential surface of the casing portion.

9. The reverse osmosis apparatus of claim 6, wherein one of the reverse osmosis membrane units and another reverse osmosis membrane unit are connected to each other in series by an adapter that is inserted into outlet holes of both the reverse osmosis membrane units to connect central flow paths thereof to each other.

10. The reverse osmosis apparatus of claim 9, wherein the adapter comprises:
a first insertion tube inserted into the outlet hole of the one reverse osmosis membrane unit;
a second insertion tube inserted into the outlet hole of the another reverse osmosis membrane unit;
a connection tube connecting the first insertion tube and the second insertion tube to each other and configured as an integral body having an outer diameter larger than outer diameters of the first and second insertion tubes; and
a plurality of seals respectively mounted to outer circumferential surfaces of the first insertion tube and the second insertion tube.

11. A seawater desalination system comprising:
a pretreatment apparatus configured to intake seawater and filter impurities in the introduced seawater;
a cartridge filter configured to re-filter the water pre-filtered by the pretreatment apparatus; and
a reverse osmosis apparatus configured to receive the water filtered by the cartridge filter from a high pressure pump to produce fresh water by reverse osmosis,
wherein the reverse osmosis apparatus comprises:
a barrel in which a plurality of reverse osmosis membrane units each having a reverse osmosis membrane wrapped in a tube are arranged;
an inflow and outflow portion provided in a first end of the barrel and connected to a seawater inlet and a high salinity water outlet;
a partition wall configured to partition an inner space of the inflow and outflow portion into a first stage and a second stage; and
a transport space portion provided in a second end of the barrel and configured to guide water moved from a plurality of reverse osmosis membrane units arranged in the first stage to move to a plurality of reverse osmosis membrane units arranged in the second stage,
wherein part of seawater fed to the inflow and outflow portion is fed around the tubes in the barrel and insulates the plurality of reverse osmosis membrane units in the barrel from external high temperature while being moved, and flows into the transport space portion.

12. The seawater desalination system of claim 11, wherein the plurality of reverse osmosis membrane units arranged in the barrel comprises:
a plurality of first reverse osmosis membrane units arranged in a space of the first stage and configured to reduce salinity of the seawater fed from the inflow and outflow portion; and
a plurality of second reverse osmosis membrane units arranged in a space of the second stage and configured to reduce salinity of the seawater fed from the transport space portion.

13. The seawater desalination system of claim 12, wherein the reverse osmosis apparatus further comprises:
first treated water tubes connected to first ends of the plurality of first reverse osmosis membrane units and connected to an outside of the barrel by passing through the inflow and outflow portion; and
second treated water tubes connected to first ends of the plurality of second reverse osmosis membrane units and connected to the outside of the barrel by passing through the inflow and outflow portion.

14. The seawater desalination system of claim 12, wherein each of the first and second reverse osmosis membrane units is configured in a form of a tube sheet in which the plurality of reverse osmosis membrane units are connected in series, and
wherein a sheet shaped reverse osmosis membrane is wrapped around a tube having a plurality of through holes formed on a circumferential surface of the tube.

15. The seawater desalination system of claim 11, wherein the reverse osmosis apparatus further comprises:
a baffle provided in an intermediate portion in the barrel, the baffle being configured such that the plurality of reverse osmosis membrane units in the barrel are inserted into the baffle and having a plurality through holes in one side of the baffle to allow the seawater to pass.

16. The seawater desalination system of claim 11, wherein each of the first and second reverse osmosis membrane units comprises:
a cylindrical casing portion having a reverse osmosis membrane therein; and
a head portion coupled to one end of the casing portion and having an outlet hole at a center portion thereof and inlet holes at portions around the center portion.

17. The seawater desalination system of claim 16, wherein the head portion comprises:
- a cylindrical main body in which the outlet hole and the inlet holes are provided;
- a first connection tube connected to a first side of the outlet hole;
- a second connection tube connected to a second side of the outlet hole; and
- a reduced diameter portion connected from a rim of the main body to the second connection tube while being reduced in diameter thereof.

18. The seawater desalination system of claim 17, wherein the head portion further comprises:
- a head seal mounted to an outer circumferential surface of the main body to seal a gap between the outer circumferential surface of the main body and an inner circumferential surface of the casing portion; and
- a retaining ring mounted to the outer circumferential surface of the main body to fix the head portion to the inner circumferential surface of the casing portion.

19. The seawater desalination system of claim 16, wherein one of the reverse osmosis membrane units and another reverse osmosis membrane unit are connected to each other in series by an adapter that is inserted into outlet holes of both the reverse osmosis membrane units to connect central flow paths thereof to each other.

20. The seawater desalination system of claim 19, wherein the adapter comprises:
- a first insertion tube inserted into the outlet hole of the one reverse osmosis membrane unit;
- a second insertion tube inserted into the outlet hole of the another reverse osmosis membrane unit;
- a connection tube connecting the first insertion tube and the second insertion tube to each other and configured as an integral body having an outer diameter larger than outer diameters of the first and second insertion tubes; and
- a plurality of seals respectively mounted to outer circumferential surfaces of the first insertion tube and the second insertion tube.

* * * * *